UNITED STATES PATENT OFFICE.

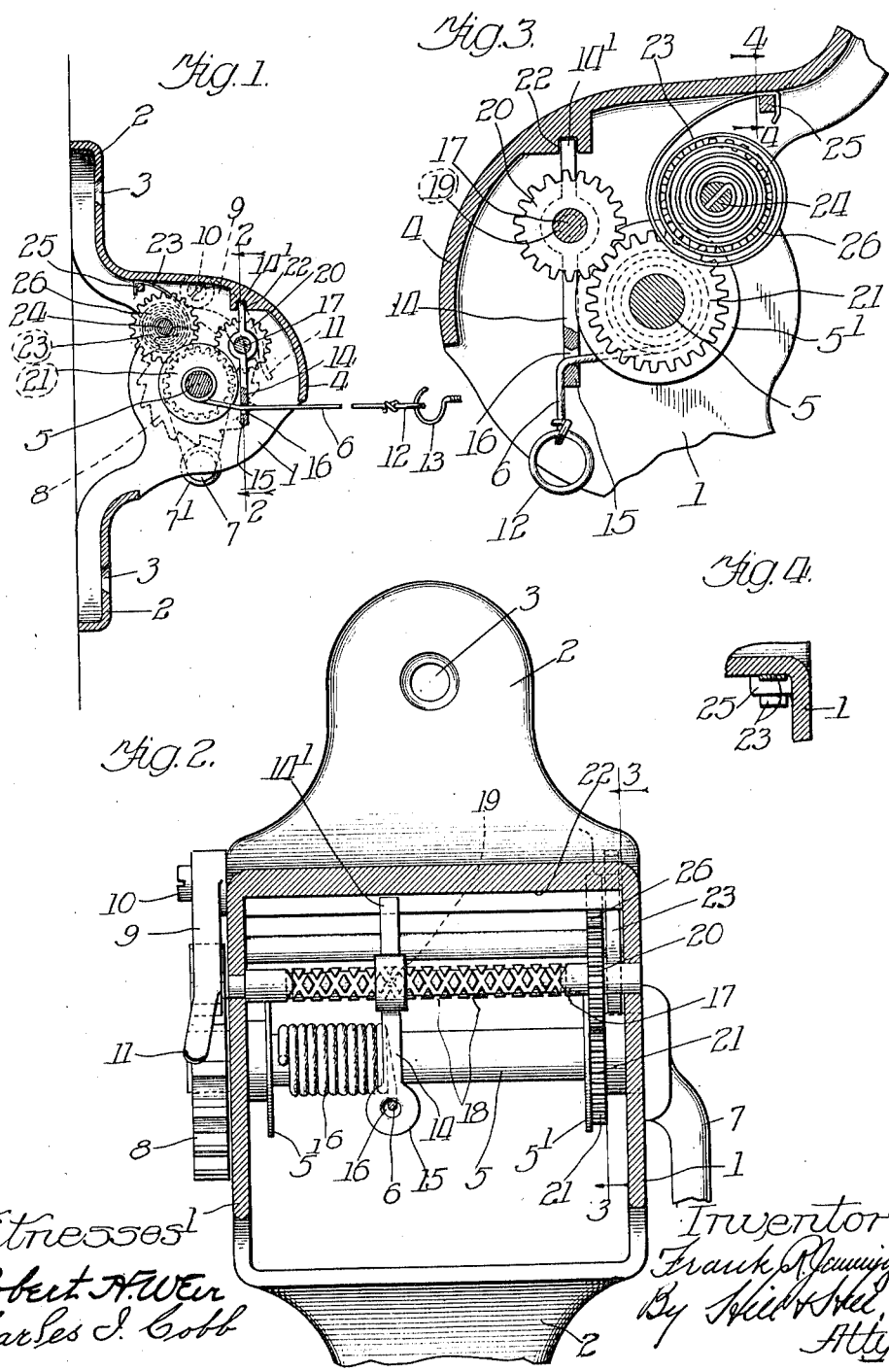

FRANK R. JENNINGS, OF CHICAGO, ILLINOIS.

LINE-REEL.

1,061,749. Specification of Letters Patent. Patented May 13, 1913.

Application filed June 23, 1910. Serial No. 568,419.

*To all whom it may concern:*

Be it known that I, FRANK R. JENNINGS, a citizen of the United States, residing at Chicago, in the county of Cook and State of Illinois, have invented certain new and useful Improvements in Line-Reels, of which the following is a description.

My invention belongs to that general class of devices known as reels or the like and relates particularly to a reel convenient for use in the interior of a house for carrying a light line or cord, and has among its objects the production of a simple, convenient, efficient and satisfactory device of the kind described that may be manufactured at comparatively small cost and used wherever found applicable.

To this end my invention consists in the novel construction, arrangement and combination of parts herein shown and described and more particularly pointed out in the claim.

In the drawings wherein like reference characters indicate like or corresponding parts, Figure 1 is a sectional view of my device, Fig. 2 is a sectional view of the same taken substantially on line 2—2 of Fig. 1, Fig. 3 is a sectional view taken substantially on line 3—3 of Fig. 2, and Fig. 4 is a small detail sectional view taken substantially on line 4—4 of Fig. 3.

Referring to the drawings, 1, 1, represent a pair of supporting members suitably connected and extended as at 2, 2 to provide means for securing the same in position to a wall, window frame or where desired. Any suitable means may be employed for securing the same in position, holes 3 being shown. Suitable screws or nails are used for this purpose. The supporting members 1, 1 are preferably provided with a hood 4 extending over the top and arranged to cover the reel 5 which is rotatably supported by the members 1, the members 1, 1 and hood 4 forming substantially a casing. The line reel is rotatably supported as mentioned, and extends without the support or casing and is provided with a crank 7 having a handle 7¹ (see Fig. 1) secured thereto, so that by rotating the crank the reel may be rotated. A line or cord 6 is secured to the reel in any suitable way and arranged to be wound thereon or unwound therefrom, as desired. The free end of the cord may be secured to where desired, as for instance, to a hook 13, a suitable ring 12 or loop being provided at the free end for engagement with the hook. To normally prevent the unwinding of the cord or line 6 from the reel when in use or at other times, I provide a ratchet 8 secured to the opposite end of the reel and arranged to coöperate with a pawl 9 pivotally secured to the casing 1 by means of a screw 10 or its equivalent. If desired, the pawl 9 may be provided with a latch or extension 11 for the convenient lifting of the same in unreeling the desired amount of line, the same being turned back out of operative position at this time. As is obvious, after the free end of the line is secured the same may be tightened by winding the reel 5 to give the desired tension and the same will be maintained taut by means of the pawl and ratchet.

In order to suitably feed or distribute the line or cord on the reel when winding, a traveler 14 may be provided having an end 15 provided with an opening 16 therethrough for the line or cord 6. Any suitable mechanism may be provided for operating the traveler 14 to properly feed or distribute the line on the reel, a convenient construction being a shaft 17 having a thread or groove 18 therein arranged to coöperate with one or more pins 19 on the traveler, the traveler being mounted on the shaft. The thread 18 is preferably double with the ends connected so that rotation of the shaft 17 longitudinally reciprocates the traveler 14 thereon and properly distributes the line. Any suitable means may be provided for rotating the shaft 17, as shown a pinion 20 is provided on the shaft 17 and a pinion 21 on the reel 5, so that as the reel is rotated the shaft 17 is also rotated. In order to guide the traveler 14 on the shaft 17 or prevent rotation of the same about the shaft the end 14 may be extended as at 14¹ and engage a groove 22 in the hood of the casing. Any equivalent arrangement may be provided, if desired.

Means may be provided for resiliently opposing the unwinding of the cord 6 as well as assisting in the winding if desired, a simple construction comprising a coiled spring 23 having one end secured to a shaft 24 and the opposite end to the casing extension 25. The shaft 24 is secured to a pinion 26 which meshes with and is driven by the pinion 21 so that when the cord is unwound from the reel the unwinding is resiliently opposed by the spring 23, thereby preventing overrunning or unnecessary slack. At the same time the spring 23 is wound so that it assists in the winding of the line on the reel again.

As before mentioned, my device is particularly applicable for carrying a light cord or line for interior use, as for example, in a kitchen, bathroom or the like. When the line is not in use it may be wound upon the reel, where it will be out of sight and covered so that dust will not settle upon the same. When it is desired to use the line it may be drawn out and the free end secured to where desired. In drawing out the line the pawl should first be raised until sufficient line is drawn out, after which it may be dropped into place so that the reel end of the line is positively held so that the weight of the clothes or articles on the line will not drag it down. When the free end of the line is disengaged from the hook or the equivalent member holding the same, the spring 23 will tend to draw it back on the reel, it being understood that the handle 7 may also be operated at the same time. In winding the line on the reel it is unnecessary to adjust the pawl since the same only limits the direction of rotation of the reel in one direction. In winding the line on the reel the traveler 14 will feed or distribute the same and prevent its bunching or all being wound at one place or end of the reel. Should the articles positioned on the line stretch the same, as soon as they are removed the spring will automatically take up the slack and the pawl automatically engage the next tooth on the ratchet, keeping the line taut at all times.

Having thus described my invention it is obvious that various immaterial modifications may be made in the same without departing from the spirit of my invention, hence I do not wish to be understood as limiting myself to the exact form, arrangement, construction or combination of parts herein shown or described or uses mentioned.

What I claim as new and desire to secure by Letters Patent is:

In a device of the kind described and in combination, a line reel, means for rotatably supporting the ends thereon and securing the reel in position, said supporting means comprising a casing having end walls connected at their top and bottom and arranged for attachment to a fixed support, the top connection extending downwardly to form a hood over said reel, said hood having a groove on the inside thereof extending substantially from end to end, means for operating the reel, said reel provided with a pinion thereon, a threaded shaft and a pinion thereon meshing with said reel pinion, a traveler positioned on said shaft and movable longitudinally thereof said traveler provided with a vertically extending bar having an opening through the lower end thereof with the upper end positioned in the groove in said hood, and means for operatively connecting said shaft and traveler, a pinion meshing with said reel pinion, a resilient member having one end connected to said supporting means and the other end to said pinion, said resilient member arranged to be wound by the unwinding rotation of said reel.

In testimony whereof, I have hereunto signed my name in the presence of two subscribing witnesses.

FRANK R. JENNINGS.

Witnesses:
 Roy W. Hill,
 Charles I. Cobb.